United States Patent
Wanderski

[19]

[11] Patent Number: 6,147,687

[45] Date of Patent: Nov. 14, 2000

[54] DYNAMIC AND SELECTIVE BUFFERING TREE VIEW REFRESH WITH VIEWABLE PENDING NOTIFICATION

[75] Inventor: Michael Christian Wanderski, Durham, N.C.

[73] Assignee: International Business Machines Corporation, Armonk, N.Y.

[21] Appl. No.: 09/165,606

[22] Filed: Oct. 2, 1998

[51] Int. Cl.[7] ....................................... G06F 3/14
[52] U.S. Cl. ........................ 345/356; 345/339; 345/966; 707/201
[58] Field of Search .................................. 345/356, 357, 345/339, 440, 968, 966, 348, 349, 353, 507, 521, 514; 707/201, 102; 709/302

[56] References Cited

U.S. PATENT DOCUMENTS

| | | | |
|---|---|---|---|
| 5,276,789 | 1/1994 | Besaw et al. ............................ | 345/440 |
| 5,444,842 | 8/1995 | Bentson et al. ......................... | 345/357 |
| 5,530,855 | 6/1996 | Satoh et al. ............................. | 707/201 |
| 5,842,216 | 11/1998 | Anderson et al. .................. | 707/201 X |
| 5,924,094 | 7/1999 | Sutter .................................. | 707/201 X |
| 5,926,816 | 7/1999 | Bauer et al. ........................ | 707/201 X |
| 5,999,926 | 12/1999 | Suciu .................................. | 707/201 X |
| 6,052,688 | 4/2000 | Thorsen .............................. | 707/102 X |
| 6,073,137 | 6/2000 | Brown et al. ....................... | 707/102 X |

*Primary Examiner*—Raymond J. Bayerl
*Attorney, Agent, or Firm*—Marcia L. Doubet; Jeanine S. Ray-Yarletts

[57] ABSTRACT

A method, system, and computer-readable code for decoupling data structure updates from a user-manipulable view of the data structure that is presented to the user in a graphical user interface. The data structure updates are buffered, and applied selectively, enabling the user to manipulate the data structure without interference from the update process. Preferably, the presentation of the items in the view indicates graphically that updates are pending (e.g. through use of a distinguishable font or icon). The update process may be triggered by user request, timer-driver means, or other user-configurable event(s). The update process may include use of one or more display filters, that serve to limit what is shown to the user in the resulting updated view. This filtering will be particularly useful for devices that have a limited amount of display space.

29 Claims, 7 Drawing Sheets

DYNAMIC AND SELECTIVE BUFFERING TREE VIEW REFRESH WITH VIEWABLE PENDING NOTIFICATION

BACKGROUND OF THE INVENTION

1. Field of the Invention

The present invention relates to a computer system, and deals more particularly with a method, system, and computer-readable code for decoupling data structure updates from a user-manipulable view of the data structure that is presented to the user in a graphical user interface.

2. Description of the Related Art

Modern computer programs typically present information to people using those programs through a graphical user interface ("GUI"). In a GUI, information is depicted using graphical elements such as icons, menus, etc., as well as text. A user interacts with these graphical elements using the keyboard or some type of pointing or selecting device, such as a mouse or light pen.

When the information displayed in the GUI is the directory structure of the files or objects stored on a storage device of the computer, the structure is often presented using a hierarchical tree view. An example of this type of hierarchical tree presentation is that used by file managers such as Windows Explorer from Microsoft Corporation. The hierarchical tree depicted by such file managers reflects the underlying structure of the directory, where a disk drive identifier is considered to be the root of the tree, and any files or subdirectories stored on that drive are branches from this root. The relationship between the levels of the hierarchy is referred to as "containment"—that is, the directories at one level contain files and subdirectories at the next lower level. Accordingly, those elements which contain other elements (i.e. the disk drive and the directories) may be referred to as "containers". For ease of reference, the term "objects" will be used hereinafter to refer to the element of the data structure - both files and directories, whether they are containers or contained—unless otherwise indicated. (This is not meant to imply that the present invention is limited to use in an object-oriented programming environment.)

Hierarchical data structures also exist in scenarios other than representation of file and directory structures. For example, the object model in an object-oriented programming environment typically has objects of types referred to as packages (or applications), classes, and methods. These objects are linked by relationships of several different types, including containment. For example, methods are contained within classes, which are contained within packages (or applications). The hierarchical relationship among the objects in the programming environment can be displayed using a tree view in a similar manner to that described above for directory and file structures. Accordingly, while the directory structure scenario is used for descriptive purposes herein, the present invention is not limited to use in that environment, and may be used in any situation where a hierarchical data structure exists that can then be displayed in a tree view.

Changes may be made to the objects of the data structure underlying this tree view. For example, new objects may be added, existing objects may be deleted, or objects may be moved from one place in the hierarchy to another. The operation may apply to a single file or directory at the lowest level of the hierarchy (referred to as a "leaf" node), or it may apply to a container at some intermediate level of the tree. Operations on containers typically apply to their contained objects as well. That is, if a directory containing files and/or subdirectories is moved or deleted, then contained objects are typically moved or deleted also.

The data structure changes may be due to the operation of an application program, or to the actions of the user interacting with the GUI. An example of the former case is executing a Web browser application program, which sends requests for information into the Internet. When the response is received, it will typically be stored as one or more files on a disk drive. Or, an application program may delete a directory or file, or create a new file into which it will write data as it executes. These types of updates to the data structure occur whether or not the structure is being displayed on the GUI. As an example of the latter case, the user may be viewing the tree structure, and use the mouse to drag a container from one location of the tree to another. The tree view must be displayed for the user to interact with it through the GUI.

Certain types of application programs may generate a very high volume of updates to the file structure. Web browsers, mentioned above, are one such type of application program, and are used when the user is working with a client application connected through a network to a server. In the general case, the network may be a private network, such as a corporate intranet of networked computers that is accessible only to computer users within that corporation, or an extranet (that is, a network owned or managed by another company, and which provides services to computers that are authorized to access it). Or, it may a public network, such as the Internet or World Wide Web. The Internet is a vast collection of computing resources, interconnected as a network, from sites around the world. The World Wide Web (referred to herein as the "Web") is that portion of the Internet which uses the HyperText Transfer Protocol ("HTTP") as a protocol for exchanging messages. (Alternatively, other protocols such as the "HTTPS" protocol can be used, where this protocol is a security-enhanced version of HTTP.)

The user may connect his computer to a server using a "wireline" connection, or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a Local Area Network (LAN) card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to as a "workstation", and use of the terms "workstation" or "server" refers to any of the types of computing devices described above.

A user of the Internet typically accesses and uses the Internet by establishing a network connection through the services of an Internet Service Provider (ISP). An ISP provides computer users the ability to dial a telephone number using their workstation modem (or other connection facility, such as satellite transmission), thereby establishing a connection to a remote computer owned or managed by the ISP. This remote computer then makes services available to the user's computer, hence such computers are often referred to as "servers". Typical services include: providing a search facility to search throughout the interconnected computers of the Internet for items of interest to the user; a browse capability, for displaying information located with the search facility; and an electronic mail facility, with which the user can send and receive mail messages to and from other computer users. Similar facilities are typically available when the user connects to a server in an intranet or an extranet.

The user working in a networked environment will have software running on his workstation to allow him to create and send requests for information to a server, and to see the results. When the user connects to the Web, these functions are typically combined in software that is referred to as a "Web browser", or "browser". These terms may also be used when the connection is to an intranet or extranet. After the user has created his request using the browser, the request message is sent out into the network for processing. The target of the request message is one of the interconnected servers in the network. That server will receive the message, attempt to find the data satisfying the user's request, fonnat that data for display with the user's browser, and return the fonnatted response to the browser software running on the user's workstation. The response is often in the form of data that can be used to create a full-screen display, referred to as a "Web page", that may contain text, graphics, images, sound, video, etc. The user will also typically have an electronic mail ("e-mail") software package installed on his workstation, which enables him to send and receive e-mail to and from the workstation of other computer users. Additionally, the user may have software on his workstation that supports sending requests to, and receiving responses from, automated file delivery services. For example, the File Transfer Protocol ("FTP") may be used to request that a file stored in a remote location be delivered to the user's workstation.

These are examples of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server". The terms "Web page" and "Web server", as used hereinafter, apply equivalently whether the server is located in the Internet, an intranet, an extranet, etc.

Techniques are known for receiving the files sent from a server using a "background" approach at the user's workstation, where the files are stored on a storage device of the workstation without interrupting the user's current task. (Alternatively, when the workstation is a constrained device such as a handheld computer that does not have storage devices such as disk drives, the files may be stored in the workstation's random-access memory.) The files are then available for later use (including display thereof), according to the user's wishes and the processing requirements of the application programs he executes. It is not uncommon for 20 or more files to be received at the user's workstation for creating a single Web page when, for example, the page contains many embedded images, sounds, etc. that are stored as separate files.

The user may have also been working in disconnected mode for some period of time, whereby an application that is intended for use with a network connection to a server enables the user to perform tasks at a time when he does not have such a connection. Requests generated by the tasks are queued at the workstation, and will be sent to the server when a connection is established. This type of operation tends to result in a flurry of file activity when the connection is established, as the server returns files in response to the queued requests. (Disconnected mode is common with mobile devices which may connect using a wireless connection, such as a cellular telephone service, where the user is billed per unit of connect time. Connection charges can be reduced by working in this manner.)

Existing techniques for file management and data structure presentation apply updates to the data structure as they occur in response to user-invoked changes or changes resulting from operation of one or more application programs. While the changes are being applied, the view of the data structure is locked. That is, the GUI process which handles user interaction with the displayed view does not allow the user to manipulate the structure by selecting objects, dragging and dropping objects, or otherwise interacting with the view. Preventing the user from interacting with the displayed information in this manner leads to frustration and annoyance. As the volume of updates increases, the amount of time the view is locked to enable applying those updates also increases, making the GUI operations unavailable to the user for correspondingly longer periods of time. When the user is receiving files from a server, as discussed above, the number of application-generated updates is unpredictable. At the same time, the frequency with which users will work in this manner is increasing, due to such trends as the rising popularity of working with the Internet and working with networked applications (including working in disconnected mode) from mobile devices. Data management applications also tend to proceed in lockstep with the user-invoked changes, waiting until the user completes a change before modifying the underlying data structure. If the user takes a long time to complete the change, or changes his mind and does not complete a request, then the efficiency of the data management application is reduced.

Accordingly, a need exists for a technique that decouples the data structure updates from the user-manipulable view of the data structure that is presented to the user in the graphical user interface. The proposed technique buffers the data structure updates, and uses separate threads for the update process and the presentation of the view, enabling the user to manipulate the data structure from the GUI without interference from the update process.

SUMMARY OF THE INVENTION

An object of the present invention is to provide a technique which decouples data structure updates from a user-manipulable view of the data structure that is presented to the user in a graphical user interface.

Another object of the present invention is to provide this decoupling by buffering data structure updates, and applying them selectively in response to a user request, timer-driven means, or other user-configurable event(s).

It is another object of the present invention to provide a graphical indication of pending updates along with this decoupling technique, as a notification to the user.

It is a further object of the present invention to provide for application of one or more display filters as the data structure is being updated, limiting what is shown in the updated view.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for use in a computing environment capable of having a connection to a network, for decoupling data structure updates from a user-manipulable view of said data structure, comprising: a plurality of objects stored by said computer system; a hierarchical data structure, representing a relationship among said plurality of objects; a plurality of graphical objects displayed on a graphical user interface of said computer system, wherein said graphical objects represent a tree view of said hierarchical data structure at a point in time; a subprocess for making updates to said stored objects, necessitating corresponding updates to said data structure; a subprocess for buffering an indication of said updates for later application to said tree view; a subprocess for enabling a user of said computer system to interact with said tree view without interference from said subprocess for making updates; a subprocess for detecting a container refresh action; a subprocess, responsive to said subprocess for detecting, for applying said buffered indications to said tree view, creating a refreshed tree view; and a subprocess for displaying said refreshed tree view. Preferably, said subprocess for buffering further comprises a subprocess for providing a visual indication to said user that said updates are pending. Said subprocess for detecting a container refresh action may detect a user-invoked refresh request, or a timer-invoked refresh request. Optionally, said subprocess for applying said buffered indications further comprises a subprocess for applying an action filter when creating said refreshed tree view.

The present invention will now be described with reference to the following drawings, in which like reference numbers denote the same element throughout.

DESCRIPTION OF THE PREFERRED EMBODIMENT

Figure 1:
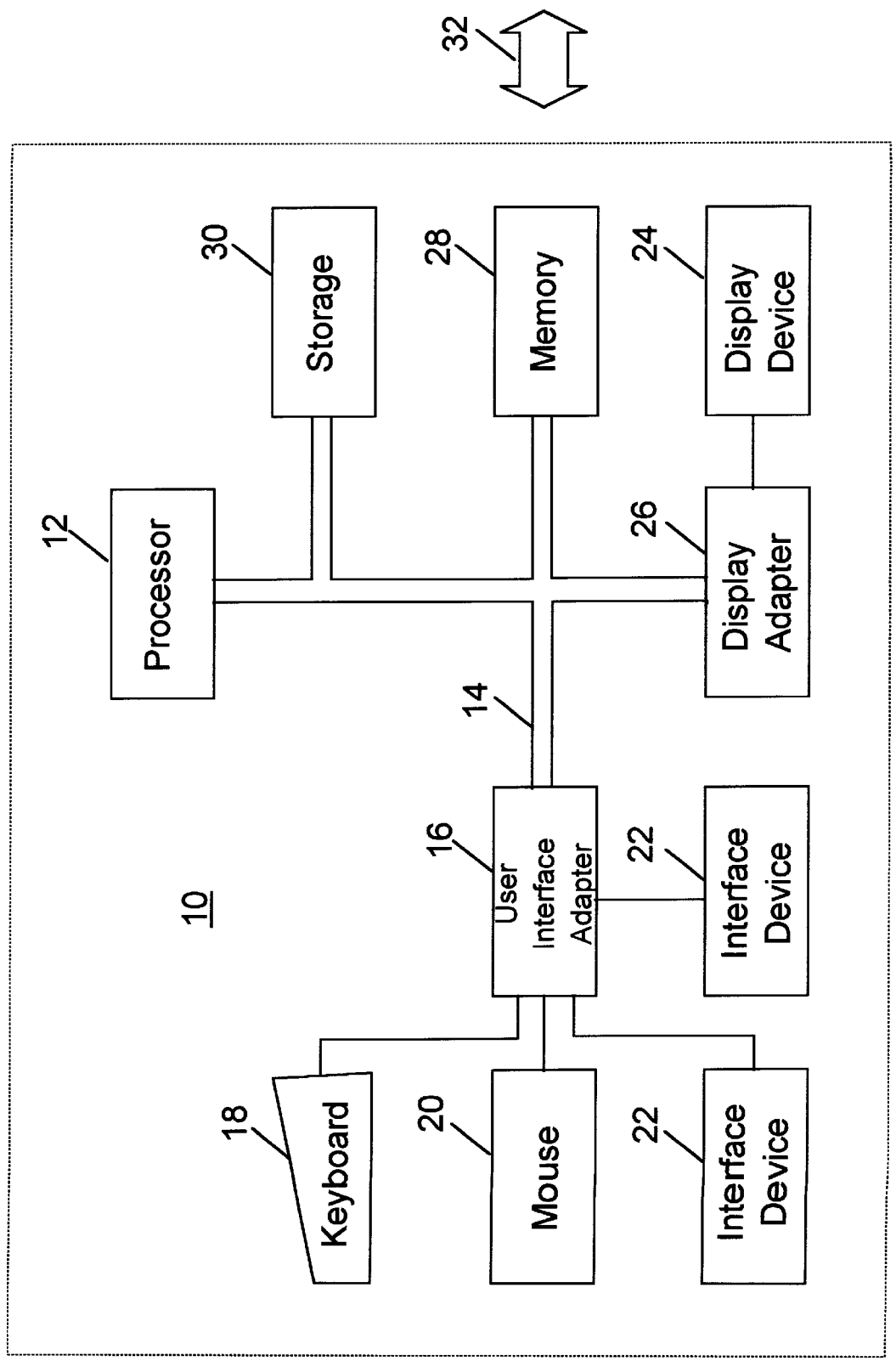
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20 and/or other interface devices 22 which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 (if applicable), which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as appropriate communications hardware and software, are known in the art.

Figure 2:
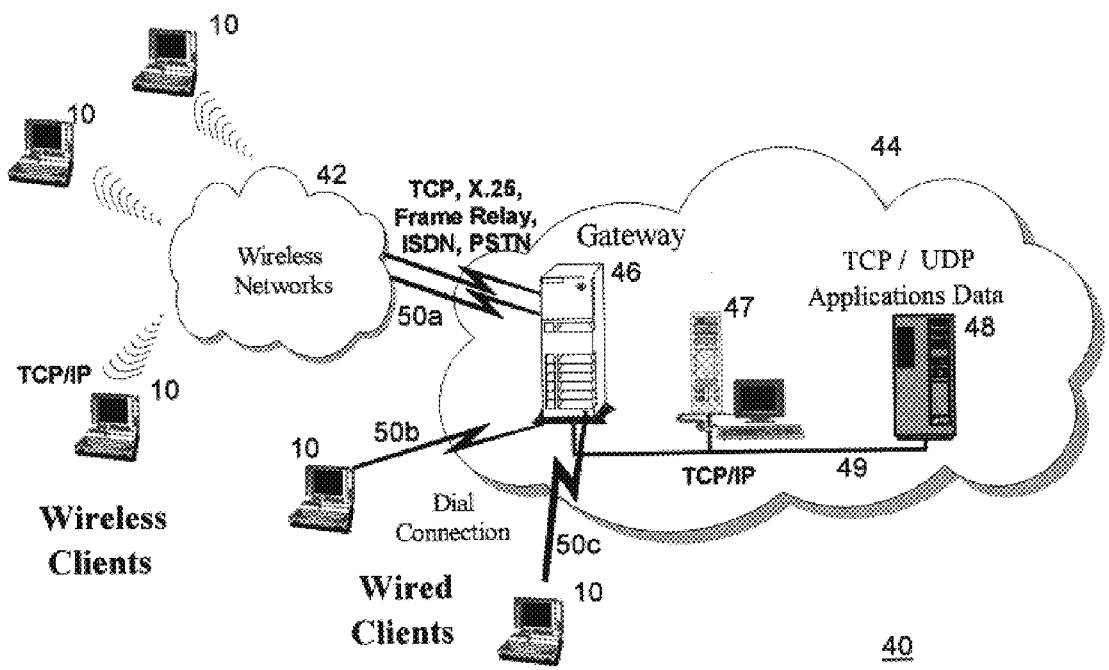
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and (wireline) network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. It may function as an application server, as well as a point of entry, or may be linked to a separate computer 47 that provides application services. The gateway 46 may be coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The preferred embodiment of the present invention will now be discussed with reference to FIGS. 3 through 5.

In the preferred embodiment, the present invention is implemented as a computer software program. This program will be used where a tree view of a data structure is being presented to a user in a GUI. The implementation of the logic of the present invention may be integrated with the code of the presentation application, as one or more modules (also referred to as code subroutines, or "objects" in object-oriented programming) which are invoked during execution of the application. The implementation will execute on a user's workstation, which may be connected to a server through a network. In a Web environment, files necessitating directory structure updates will typically be sent to the workstation from the server using the HyperText Transfer Protocol (HTTP). However, because the present invention operates independently of the mechanism with which updates are generated, other protocols such as FTP, Gopher, proprietary protocols, etc., may also be used for file delivery without deviating from the inventive concepts defined herein.

While the preferred embodiment will be discussed in terms of file updates that result from interacting with a server, the novel concepts of the present invention are not limited to use in this situation. The update buffering and selective refresh technique can be used advantageously regardless of the source of the file updates. For example, a large number of "temporary" files are often stored on the user's workstation as Web pages are downloaded from a server, where those temporary files may contain the content used to create a Web page display. The user may have software on his workstation that automatically purges these temporary files some specified period of time after they are received, or after their last usage, etc. As this software executes, a large number of files may be deleted, even though there is currently no network connection and no server interaction. As another example, the user may execute an application which copies a large number of files from a CD-ROM to the hard disk of his workstation, resulting in a large number of additions to the file structure. At the same time applications such as these are executing, the user may be displaying the file structure of the affected storage device, and will be able to interact with the displayed view through use of the present invention. As a further example, the user may be viewing the hierarchical structure of objects in an object-oriented programming environment, at the same time the underlying structure is changing, and may use the present invention advantageously to simultaneously interact with the tree view.

Figure 3A:
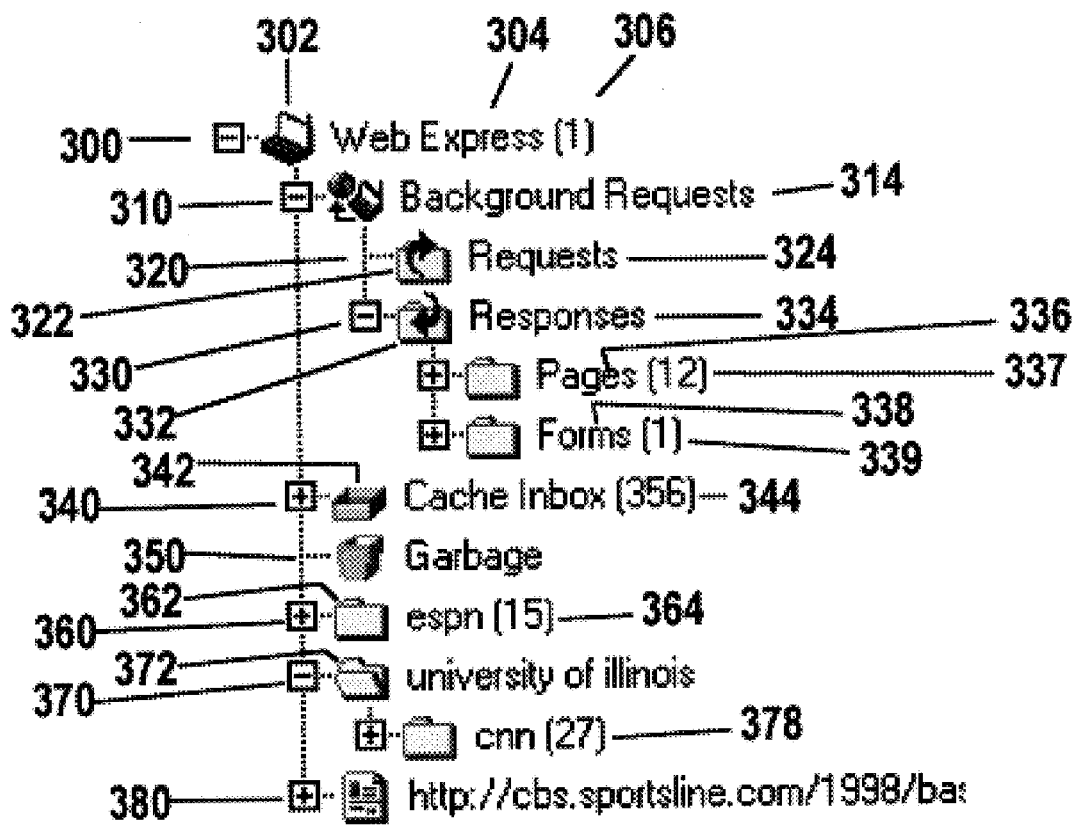
FIGS. 3A–3C illustrate tree views of a data structure presented by the present invention, including visual notification of pending updates.
Figure 3B:
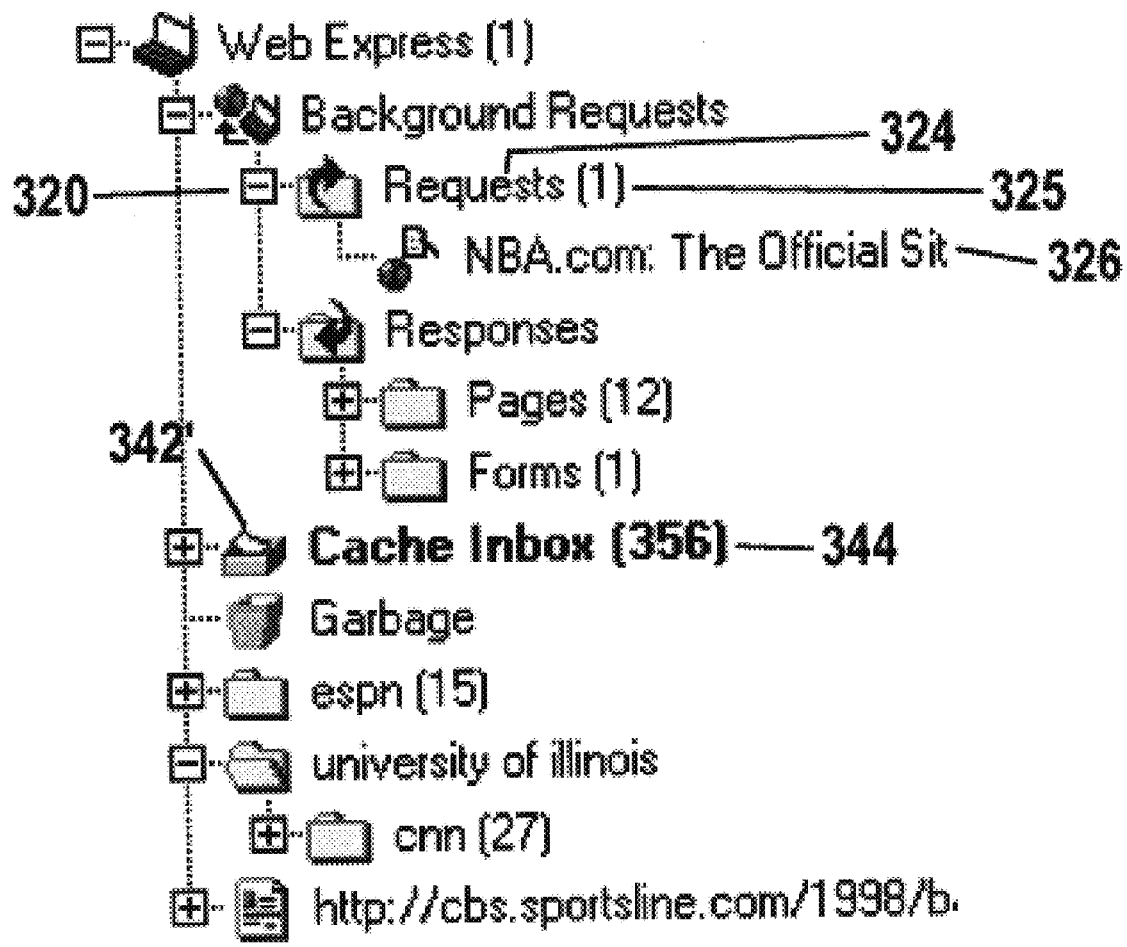
Figure 3C:
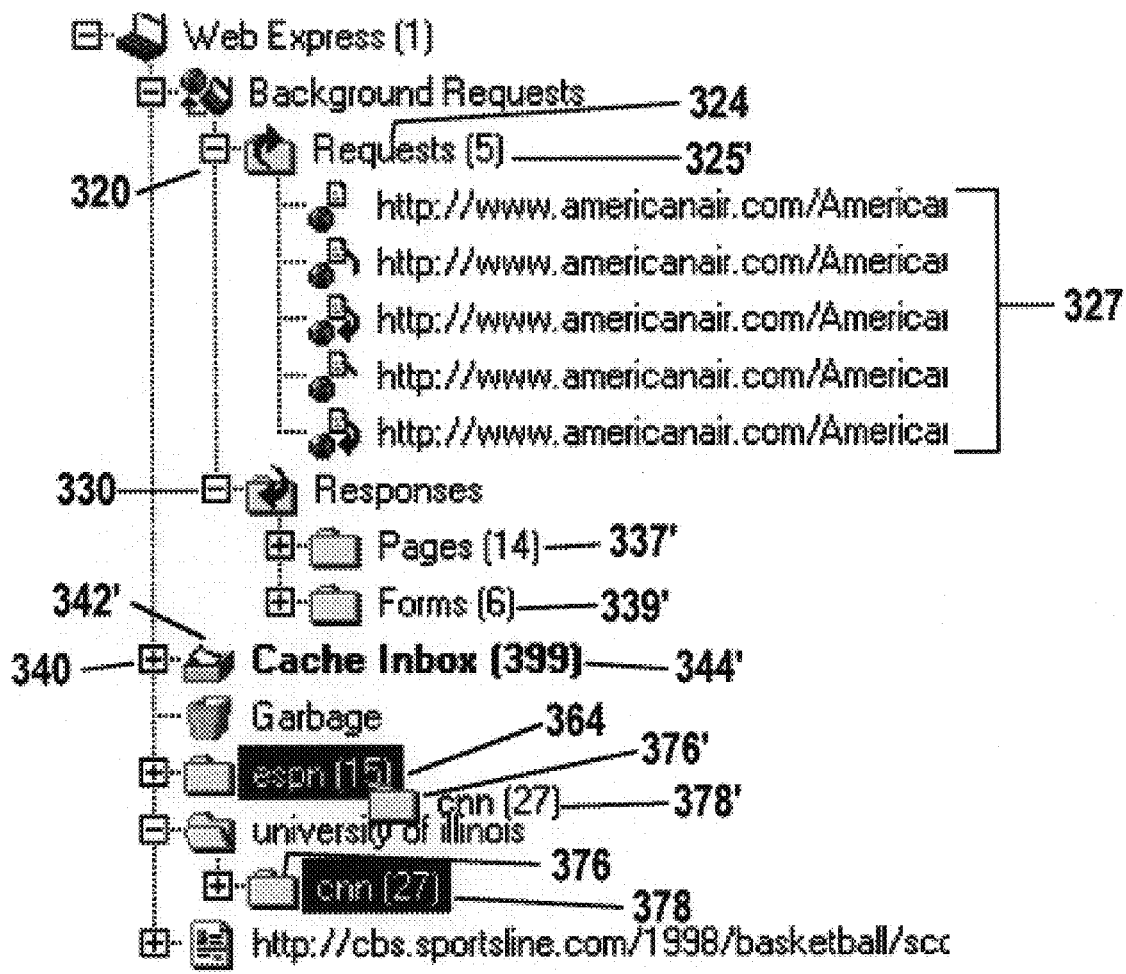

FIGS. 3A–3C illustrate tree views of a data structure presented by the present invention, and depict use of the present invention in the directory structure presentation scenario. The hierarchical structure shown in these views includes the directories and files of an example storage device. FIG. 3A shows the structure at a point in time; FIG. 3B shows the structure at a later point, when updates are pending; and FIG. 3C shows a user interacting with the presented view, requesting further updates to the underlying structure, at the same time other updates remain pending.

The topmost level of the hierarchy is shown at 300 in FIG. 3A. The "−" icon used here a commonly-known technique for indicating that this level of the hierarchy is fully expanded. This expansion shows that the next lower levels of the hierarchy are 310, 340, 350, 360, 370, and 380. When a "+" icon appears at a level, as at 360 and 380, this indicates that the hierarchy is not yet fully expanded at the corresponding level.

A further icon 302 is shown at the topmost level, representing (for this example) the device on which the structure resides. Use of such an additional icon is optional at a level, but used by the preferred embodiment to give the user a visual indication of the type of data represented at a given level. Other icons such as 362 and 372, representing a closed folder and an opened folder, respectively, may be used as well. The icon 342 represents an "in box", giving the user an indication that this is a place where incoming data may arrive. The folder icons 322 and 332 are augmented with arrows, giving the user a sense that data leaves from the folder 322 (having an "outgoing" arrow), and arrives into folder 332 (having an "incoming" arrow).

An identifier 304 is also displayed to the right of icons 300 and 302, providing more information about this top level of the hierarchy. Other levels use other identifiers to explain their purpose. These identifiers may be assigned by an application, or created by a user, as is known in the art. Identifier 314 shows that there is a level in the hierarchy of this example for "Background Requests", of the type which were discussed earlier. This level is further organized into a "Requests" level 320, identified at 324, and a "Responses" level 330, identified at 334. Requests for information may be queued as files stored at level 320. The responses to these requests may be stored as files at level 330.

A numeric entry 306 is optionally presented as the final piece of information for a level of the structure, according to the preferred embodiment, and indicates the number of objects stored at this level. In this example, the requests at level 330 have been further organized into "Pages" 336 and "Forms" 338. At the current time, there are 12 pages and 1 form stored, as indicated at 337 and 339. Additionally, there are 356 objects (files and/or subdirectories, for this example) stored in the "Cache Inbox" 344; 15 objects stored in the "espn" level 364; and 27 objects stored in the "cnn" level 378.

FIG. 3B shows this same structure, after some amount of time has passed during which updates occurred. In this example, a new object was added to the Requests level 320, as shown by the new entry 326. Additionally, a numeric entry 325 has been added to the right of Requests 324, showing that there is now one object at that level. The Cache Inbox level 344 has also been visually highlighted in FIG. 3B, by displaying the text using a bold font, and its icon 342' now shows a paper in the in box. These changes indicate visually to the user that updates are pending for the structure at this level. This is merely one technique for visually indicating pending updates. Other techniques could be used without deviating from the inventive concepts of the present invention. For example, a folder icon such as 362 could be changed to a folder having papers extending from the top, to indicate that requests to add objects were pending. In the preferred embodiment, the visual indicator does not differentiate among the potential types of updates that are pending. Alternatively, one indicator could be used when the pending update was addition of new objects, another indicator could be used for pending deletions, etc.

FIG. 3C shows the same structure, after yet more time has passed, and also shows the user's interaction with the tree view. The Requests level 320 now contains 5 objects, as indicated at 325'. The prior object 326 is gone, and the 5 new objects are shown at 327. The number of objects at the Responses level 330 has also changed, as shown at 337' and 339'. In addition, the number of objects pending in the Cache Inbox level 340 has also changed, as shown at 344'. Note that the font used at this level is still bold, and the icon 342' still shows a paper in the in box, to notify the user that updates are (still) pending. Entry 378 is shown as being highlighted, indicating that the user has selected this entry (for example, by positioning a mouse pointer over the entry, and pressing a selection button on the mouse). Duplicate copies of the entry and its folder icon 376 are also shown as entry 378' and folder icon 376', to represent the user dragging this entry to move its underlying objects to a different place in the hierarchy. Entry 364 is shown as being selected, which may occur in response to the user dragging the items 378' and 376' over it, signifying to the user that this is where the objects will move if they are dropped while in their current location. (The manner in which entries in the hierarchy are highlighted in the drag and drop operations does not form part of the present invention, and is accomplished using techniques which are well known in the art.) Thus, it can be seen in FIG. 3C that the user is not prohibited from interacting with the tree view, even though there are updates to be made to the underlying data structure.

Figure 4:
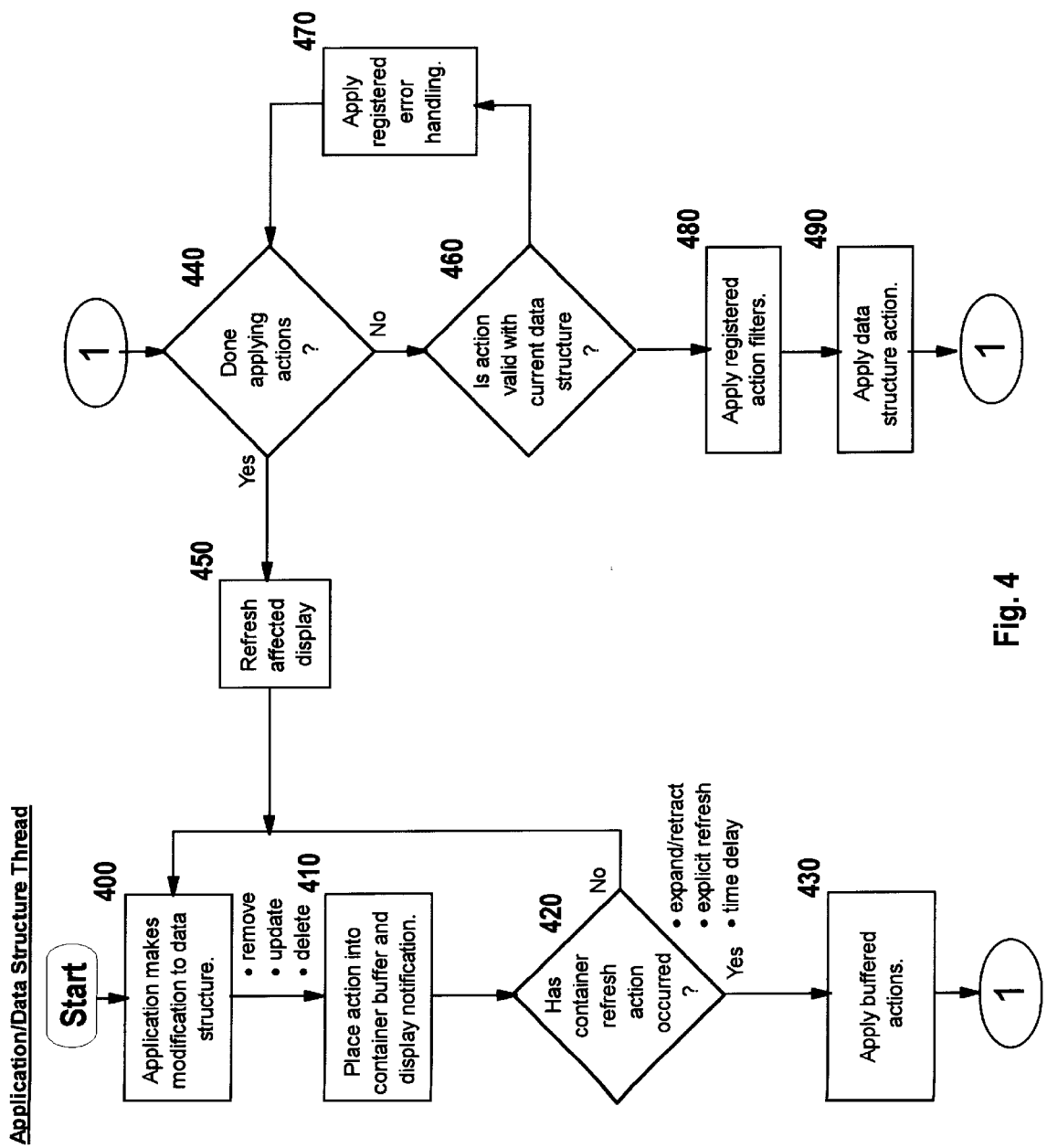
FIGS. 4 and 5 depict flowcharts illustrating the logic with which a preferred embodiment of the present invention may be implemented.
Figure 5:
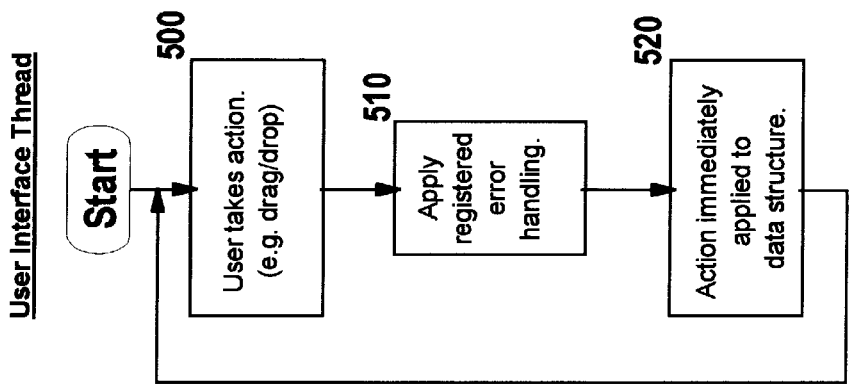

FIGS. 4 and 5 illustrate flowcharts of the logic that may be used to implement a preferred embodiment of the present invention. The preferred embodiment uses a thread for an application that generates and applies changes to the data structure, and a separate thread for the graphical user interface that enables the user to interact with the tree view. The logic used in these threads is shown as FIGS. 4 and 5, respectively. (More than one thread may be used in an application program, as required by the application; however, according to the present invention, the user interface thread will be distinct from those being used for the application.)

The application thread processing comprises a repeating loop which begins at Block 400 of FIG. 4. Note that this logic does not include the details of the application-specific processing, but is focused on the logic used to implement the present invention. The manner in which this logic is incorporated within an application program will be obvious to one of ordinary skill in the art. At Block 400, an application has made some type of update to the underlying data structure that is currently being displayed in the tree view. This update may be addition of a new file or directory, it may be deletion of one or more objects, copying or moving objects, etc. In the prior art, the tree view would be locked while this update is applied, preventing the user from interacting with the tree view. According to the present invention, however, the tree view is not updated to reflect the latest data structure at this point. Instead, Block 410 places an entry in a buffer for the affected container, and simply changes the tree view to indicate that an update is pending for this container. This type of change to the tree view can be accomplished very quickly, compared to waiting for a file update operation to complete. The change used by the preferred embodiment to visually notify the user of pending updates has been previously described with reference to FIG. 3B, where a different icon and a different font were used to display the affected hierarchy level.

Block 420 then asks if a container refresh action has occurred. A "container refresh" is the process by which the tree view will be updated, or refreshed, to show the hierarchy as it actually exists at the current time—that is, the hierarchy that results from application of the updates that were pending. The action that invokes the container refresh may be an explicit user request. For example, a function key may be defined which, when pressed, signifies the user's request to refresh the tree view. User requests may be implemented in other ways which are well known in the art, such as with pull-down or pop-up menus having a choice such as "Refresh". Or, the refresh action could be invoked whenever the user takes some other action, such as when a "−" or "+" icon is selected by the user for retracting or expanding a container. By refreshing the display at the user's request, the degree of user frustration that resulted in the prior art from a locked tree view will be greatly decreased, because the user will be aware that changes are occurring. And, since the refresh is simply a display change, to reflect updates that occurred to the underlying data structure asynchronously (as opposed to the prior art approach, where updates to the display were made as part of the process of applying the actual data updates, which could be quite time-consuming), the length of time required to refresh the display is greatly reduced. Finally, since a separate thread is used to process the display updates, the thread that processes the user's interactions with the GUI is not required to wait even for the display refresh to finish.

Other actions may invoke a display refresh as well. A timer-driven means may be used, whereby the display refreshes at defined time intervals. The time intervals may be absolute, based only upon an elapsed time interval, or they may be relative intervals which include other factors besides time. For example, a refresh may be triggered if a certain amount of time passes after a file update (an event), without occurrence of a user-invoked refresh. An application may choose to recognize only one type of refresh event, or it may recognize multiple events. In the latter case, occurrence of any of the recognized events will invoke the refresh. The specific event(s) that will be recognized may be predefined for an implementation, or may be configurable (e.g. by providing a configuration option to a user such as a system administrator).

When the test at Block 420 has a negative response, it is not yet time to refresh the display, so control returns to Block 400 to await the next data structure update. When the response is positive, however, control transfers to Block 430, which indicates that the buffered actions are applied to change the tree view structure. Preferably, the buffered actions at every level will be applied during this process. Alternatively, the updates may be limited to those actions buffered for a single container. This latter approach may be useful where the refresh action is invoked in response to the user selecting a container and then requesting the refresh, or when the refresh is defined to occur in response to expansion or retraction of a container. The process with which buffered actions are applied is shown in more detail in Blocks 440 through 490 of FIG. 4.

At Block 440, a test is made to determine whether all the pending updates have been applied to the tree view structure. If this test has a positive response, then Block 450 refreshes the view displayed to the user (i.e. displays a new, updated view), and returns control to Block 400. Otherwise, Block 460 checks to see if the action currently being processed is valid with respect to the current underlying data structure. This check acknowledges that the underlying data structure is changing while update actions are pending for its view, and that later changes to the data structure may make a pending action no longer applicable. For example, one action may move an object to a new place in the object hierarchy, while a later action deletes the container into which this object was moved (thereby deleting the moved object as well). The preferred embodiment of the present invention processes the actions from a buffer in FIFO (First-In, First-Out) sequence. Accordingly, when the move action from this example is being processed from the buffer, the container to which the object is to be moved no longer exists in the actual underlying structure. Block 460 will recognize this, and transfer control to Block 470. At Block 470, instead of applying the buffered action, any error handling that has been registered will be applied. Use of this type of error processing is optional: the action could simply be discarded as an alternative. When error processing is used, it may comprise writing an entry into a log file specifying the action that could not be processed, displaying a message to the user, or other processing according to the needs of the application.

When the current action from the buffer is still valid, Block 480 receives control. At Block 480, registered action filters may optionally be applied. An action filter specifies processing that is to be performed upon particular types of events. As used by the present invention, the events include file update operations. For example, when the action is to delete an object (or remove it, equivalently), a file management system such as Windows Explorer may create a representation of the deleted object in a separate "Recycle Bin" folder as part of the delete operation. When it is desired to change this processing, for example to not create the separate representation, an action filter can be used to recognize the delete operation and specify different processing. Action filters may also be used advantageously with the present invention to limit the data displayed in a tree view. Some workstations such as handheld computers have limited display space available, and may not be able to display a tree view for the full data structure. Or, there may not be sufficient room to display the structure when one or more branches are expanded, etc. Action filters can be used to accommodate these limited-display devices. For example, if the structure being displayed represents the file structure for the device, and the device has only one storage device, it may not be considered useful to display an entry in the hierarchy for that storage device. Or, certain files (such as the Recycle Bin or Garbage container 350) may not be considered important or useful enough to display. An action filter can be created that will cause such entries to be omitted. Techniques for creating and applying action filters are known in the art.

At Block 490, the buffered action is applied, causing a corresponding update to the tree view structure. Control then transfers back to Block 440, to determine if there are more buffered actions to apply before the revised tree view is presented to the user.

FIG. 5 illustrates the processing of the GUI thread that enables the user to interact with the tree view. At Block 500, the user has taken some action, such as selecting an object, dragging and dropping it, etc. The user's actions are processed using techniques which are well known in the art. At Block 510, any error handling that is applicable to the user's action is applied. For example, if the user drags an object and drops it onto an invalid location, an error message may be displayed. Block 520 indicates that the change to the underlying data structure that results from the user's action is immediately applied. The tree view is updated as well. For example, if the user's action is deleting a container object, then the objects represented by that container are deleted from the storage device. Note that the user's action may also generate a container refresh event, depending on how refresh events were defined, which will then be processed according to the logic in FIG. 4. Control returns from Block 520 to Block 500, to await the user's next interaction with the GUI presentation of the tree view.

Using the buffering technique and separate thread approach of the present invention, as described above, an application program is free to make changes to the underlying data structure without waiting for the user to complete actions at the graphical user interface. At the same time, the user is free to make modifications through the GUI, without waiting on an update operation being performed by an application program. This will enable users to work more effectively and efficiently in environments where the data structure is rapidly changing, and/or where changes take a significant length of time to complete.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. In a computing environment capable of having a connection to a network, computer readable code embodied on a computer-readable medium for decoupling data structure updates from a user-manipulable view of said data structure, comprising:

computer-readable code means for storing a plurality of objects by a computer system in said computing environment;

computer-readable code means for creating a hierarchical data structure representing a relationship among said plurality of objects;

computer-readable code means for displaying a tree view of said hierarchical data structure on a graphical user interface of said computer system, wherein said displayed tree view represents said hierarchical data structure at a point in time and comprises a plurality of graphical objects;

computer-readable code means for making updates to said stored objects by an executing application, necessitating corresponding updates to said hierarchical data structure;

computer-readable code means for buffering said corresponding updates for later application to said displayed tree view;

computer-readable code means for enabling a user of said computer system to interact with said displayed tree view without interference from said computer-readable code means for making updates;

computer-readable code means for detecting a container refresh action;

computer-readable code means, responsive to said computer-readable code means for detecting, for applying said buffered updates to said displaced tree view, creating a refreshed tree view; and computer-readable code means for displaying said refreshed tree view.

2. Computer readable code for decoupling data structure updates from a user-manipualable view of said data structure according to claim 1, wherein said computer-readable code means for buffering updates further comprises computer-readable code means for providing a visual indication to said user that said buffered updates are pending.

3. Computer readable code for decoupling data structure updates from a user-manipulable view of said data structure according to claim 1, wherein said computer-readable code means for detecting a container refresh action detects a user-invoked refresh request.

4. Computer readable code for decoupling data structure updates from a user-manipulable view of said data structure according to claim 1, wherein said computer-readable code means for detecting a container refresh action detects a timer-invoked refresh request.

5. Computer readable code for decoupling data structure updates from a user-manipulable view of said data structure according to claim 1, wherein said computer-readable code means for applying said buffered updates further comprises computer-readable code means for applying an action filter when creating said refreshed tree view.

6. Computer readable code for decoupling data structure updates from a user-manipulable view of said data structure according to claim 5, wherein said action filter specifies different processing to be performed for selected ones of said buffered updates, and wherein said computer-readable code means for applying said action filter applies said different processing.

7. Computer readable code for decoupling data structure updates from a user-manipulable view of said data structure according to claim 5, wherein said action filter specifies that selected ones of said buffered updates are to be omitted from said displayed tree view, and wherein said computer-readable code means for applying said action filter omits said selected ones when creating said refreshed tree view.

8. Computer readable code for decoupling data structure updates from a user-manipulable view of said data structure according to claim 1, wherein said computer-readable code means for making updates to said stored objects and said computer-readable code means for enabling said user to interact with said displayed tree view use separate execution threads.

9. Computer readable code for decoupling data structure updates from a user-manipulable view of said data structure according to claim 1, wherein said computer-readable code means for detecting a container refresh action detects a user-configured event.

10. A computer system for decoupling data structure updates from a user-manipulable view of said data structure in a computing environment capable of having a connection to a network, comprising:

means for storing a plurality of objects by said computer system;

means for creating a hierarchical data structure representing a relationship among said plurality of objects;

means for displaying a tree view of said hierarchical data structure on a graphical user interface of said computer system, wherein said displayed tree view represents said hierarchical data structure at a point in time and comprises a plurality of graphical objects;

means for making updates to said stored objects by an executing application, necessitating corresponding updates to said hierarchical data structure;

means for buffering said corresponding updates for later application to said displayed tree view;

means for enabling a user of said computer system to interact with said displayed tree view without interference from said means for making updates;

means for detecting a container refresh action;

means, responsive to said means for detecting, for applying said buffered updates to said displayed tree view, creating a refreshed tree view, and means for displaying said refreshed tree view.

11. The system for decoupling data structure updates from a user-manipulable view of said data structure according to claim 10, wherein said means for buffering updates further comprises means for providing a visual indication to said user that said buffered updates are pending.

12. The system for decoupling data structure updates from a user-manipulable view of said data structure according to claim 10, wherein said means for detecting a container refresh action detects a user-invoked refresh request.

13. The system for decoupling data structure updates from a user-manipulable view of said data structure according to claim 10, wherein said means for detecting a container refresh action detects a timer-invoked refresh request.

14. The system for decoupling data structure updates from a user-manipulable view of said data structure according to claim 10, wherein said means for applying said buffered updates further comprises means for applying an action filter when creating said refreshed tree view.

15. The system for decoupling data structure updates from a user-manipulable view of said data structure according to claim 14, wherein said action filter specifies different processing to be performed for selected ones of said buffered updates, and wherein said means for applying said action filter applies said different processing.

16. The system for decoupling data structure updates from a user-manipulable view of said data structure according to claim 14, wherein said action filter specifies that selected ones of said buffered updates are to be omitted from said displayed tree view, and wherein said means for applying said action filter omits said selected ones when creating said refreshed tree view.

17. The system for decoupling data structure updates from a user-manipulable view of said data structure according to claim 10, wherein said means for making updates to said stored objects and said means for enabling said user to interact with said displayed tree view use separate execution threads.

18. The system for decoupling data structure updates from a user-manipulable view of said data structure according to claim 10, wherein said means for detecting a container refresh action detects a user-configured event.

19. A method for decoupling data structure updates from a user-manipulable view of said data structure in a computer operating in a computing environment capable of having a connection to a network comprising the steps of:

displaying a plurality of graphical objects on a graphical user interface of said computer system, wherein said graphical objects represent a tree view, at a point in time, of a hierarchical data structure representing a relationship among a plurality of objects stored by said computer system;

making updates to said stored objects by an executing application, necessitating corresponding updates to said hierarchical data structure;

buffering said corresponding updates for later application to said displayed tree view;

enabling a user of said computer system to interact with said displayed tree view without interference from said making updates step;

detecting a container refresh action;

applying, responsive to said detecting step, said buffered updates to said displayed tree view, creating a refreshed tree view; and displaying said refreshed tree view.

20. The method for decoupling data structure updates from a user-manipulable view of said data structure according to claim 19, wherein said buffering updates step further comprises the step of providing a visual indication to said user that said buffered updates are pending.

21. The method for decoupling data structure updates from a user-manipulable view of said data structure according to claim 19, wherein said detecting a container refresh action step detects a user-invoked refresh request.

22. The method for decoupling data structure updates from a user-manipulable view of said data structure according to claim 19, wherein said detecting a container refresh action step detects a timer-invoked refresh request.

23. The method for decoupling data structure updates from a user-manipulable view of said data structure according to claim 19, wherein said applying said buffered updates step further comprises the step of applying an action filter when creating said refreshed tree view.

24. The method for decoupling data structure updates from a user-manipulable view of said data structure according to claim 23, wherein said action filter specifies different processing to be performed for selected ones of said buffered updates, and wherein said applying said action filter step applies said different processing.

25. The method for decoupling data structure updates from a user-manipulable view of said data structure according to claim 23, wherein said action filter specifies that selected ones of said buffered updates are to be omitted from said displayed tree view, and wherein said applying said action filter step omits said selected ones when creating said refreshed tree view.

26. The method for decoupling data structure updates from a user-manipulable view of said data structure according to claim 19, wherein said making updates to said stored objects step and said enabling said user to interact with said displayed tree view step use separate execution threads.

27. The method for decoupling data structure updates from a user-manipulable view of said data structure according to claim 19, wherein said detecting a container refresh action step detects a user-configured event.

28. A method for providing a graphical display of a hierarchical data structure on a graphical user interface of a computing system, said method comprising steps of:

displaying a tree view of said hierarchical data structure on said graphical user interface, wherein said displayed tree view comprises a plurality of graphical objects which represent stored objects of said hierarchical data structure and relationships among said stored objects at a point in time;

making updates, by an executing application, to one or more of said stored objects;

storing said updates in a buffer for delayed application to said displayed tree view;

enabling a user of said computing system to interact with said displayed tree view without interference from said making updates step;

detecting invocation of a container refresh action, wherein said container refresh action signifies that said displayed tree view is to be refreshed;

applying one or more of said updates in said buffer, responsive to said detecting step, to said displayed tree view, thereby creating a refreshed tree view; and displaying said refreshed tree view.

29. The method according to claim 28, further comprising the step of providing a visual indicator on said graphical user interface when said buffer contains one or more updates that have not been applied to said displayed tree view.

* * * * *